J. V. HAWKEY.
Horse-Rake.
No. 71,875.
2 Sheets—Sheet 1.
Patented Dec 10. 1867.
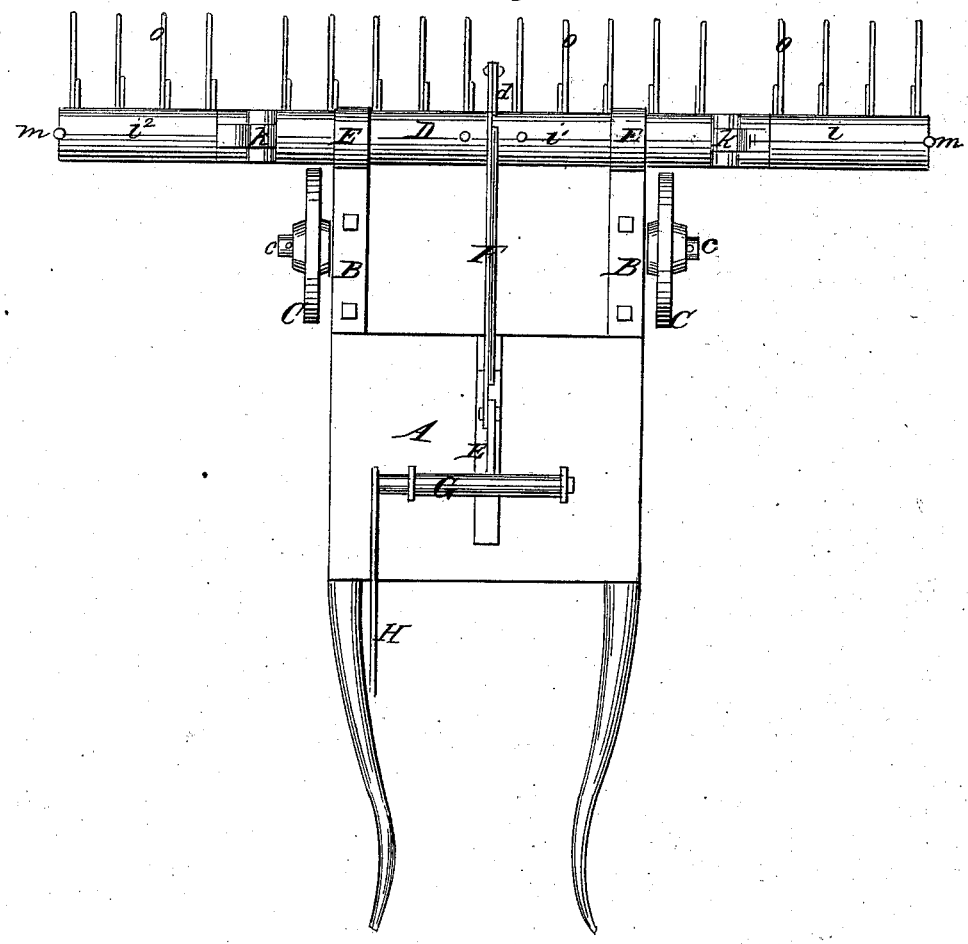

J. V. HAWKEY.
Horse-Rake.
No. 71,875.
2 Sheets—Sheet 2.
Patented Dec. 10, 1867.
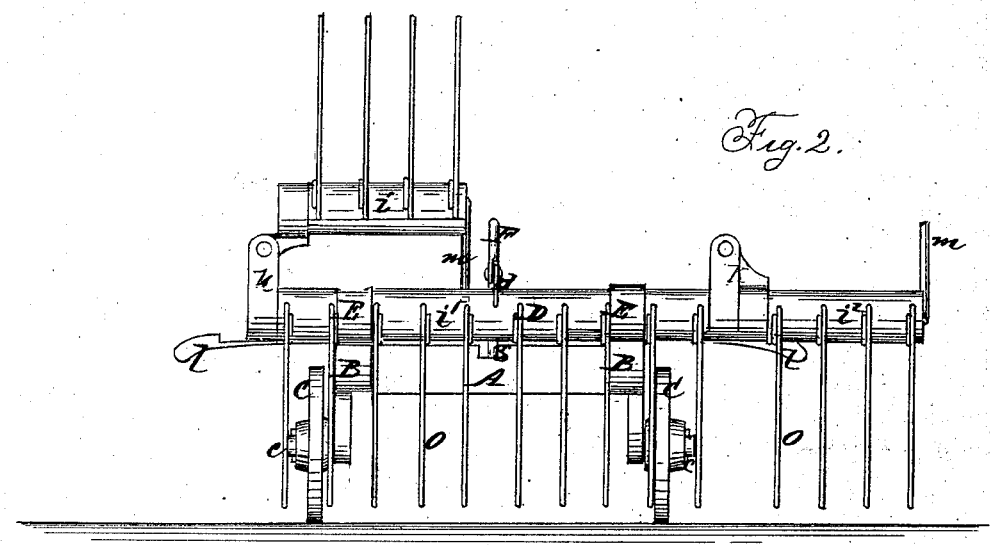
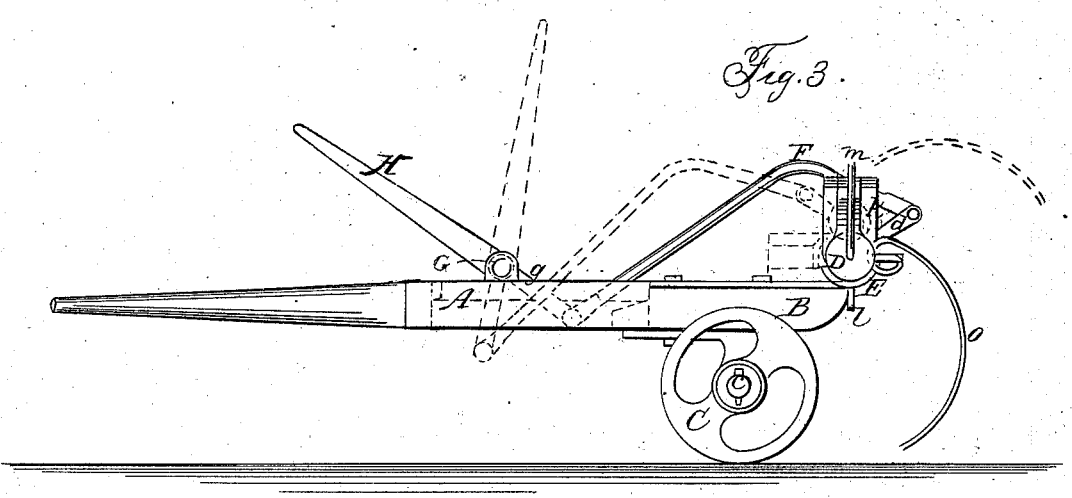

UNITED STATES PATENT OFFICE.

JOHN V. HAWKEY, OF GREENSBURG, PENNSYLVANIA, ASSIGNOR TO HIMSELF AND ISRAEL T. SHEFFLER, OF SAME PLACE.

IMPROVEMENT IN HORSE-RAKES.

Specification forming part of Letters Patent No. 71,875, dated December 10, 1867.

*To all whom it may concern:*

Be it known that I, JOHN V. HAWKEY, of Greensburg, in the county of Westmoreland and State of Pennsylvania, have invented a new and useful Improvement in Horse Hay-Rakes, of which the following is a full, clear, and exact description, reference being had to the accompanying drawings, which make part of this specification, and in which—

Figure 1 represents a plan or top view of my improved horse-rake ready for operation. Fig. 2 represents a view, in elevation, of the same as seen from the rear, with one of the sections of the rake folded over to show the joint; and Fig. 3 represents a similar view of the same as seen from one side, the lines showing the attitude assumed by the parts when the teeth are lifted.

The improvement herein claimed consists in forming the rake shaft or head in sections, connected by hinge-joints.

In the accompanying drawings, a platform, A, is shown as mounted on shafts or thills B, similar to those of a common cart, which are supported by two wheels, C, mounted on independent axles $c$, secured to brackets bolted underneath the shafts. The rake-shaft D turns freely in collars E, bolted to the rear ends of the shafts. An arm, $d$, on the rake-shaft is connected by a curved link, F, to a similar arm, $g$, on a rock-shaft, G, turning in bearings on the platform A, and controlled by a lever-handle, H, controlled by the driver, who may ride upon a seat located over the platform, so that the lever may be within easy reach. A series of independent wire teeth, O, are inserted in the rake-shaft, and coiled in the usual way to give them sufficient stiffness. When the handle H is thrown forward the teeth are depressed, and when thrown back they are elevated, as shown in Fig. 3. In this instance the rake-shaft is shown as made in three sections, $i$ $i^1$ $i^2$, connected by hinges or joints $k$, constructed as shown in the drawings, so that the outer sections may fold up vertically over the inner one, as shown in Fig. 2, and yet, when unfolded, the ends of the sections may abut and prevent the outer sections from descending below a horizontal plane. When opened, the sections are secured rigidly by spring-catches $l$ underneath the shaft, and, when folded up, a pin, $m$, on the section enters a hole in the shaft and keeps the sections in place.

It will thus be seen that by my improvement I can use a rake-shaft much longer than the machine is wide, and yet fold it up so as to pass through gates, &c. I can also allow the rake to project from either side at pleasure, or fold up the outer sections and use the inner one only.

What I claim as my invention, and desire to secure by Letters Patent, is—

1. A rake shaft or head arranged outside of the periphery of the wheels, projecting laterally beyond them, and so jointed that its sections can be folded vertically upon the carrying-frame without detaching any of the parts of the rake, substantially as described.

2. An axially-turning rake shaft so jointed that its outer sections can be folded inward without detaching any of its parts.

3. The combination of the inner fixed section of the rake-shaft with the outer vertically-folding sections, projecting beyond the wheel, substantially as and for the purpose described.

4. The combination, substantially as described, with a jointed rake-shaft, of hinges allowing the sections to fold vertically, and a locking device to hold them rigidly when unfolded.

5. The arrangement, as described, of the stop-pins $m$ on the folding sections, to secure them in position when folded up.

6. The combination, in a horse-rake, of an axially turning-folding rake-shaft with a rock-shaft controlled by a handle on the driver's platform to raise and lower the teeth.

7. The arrangement, in a horse-rake, of an axially-turning jointed rake-shaft mounted on the rear end of the thills, and supported on two wheels mounted on independent axles.

In testimony whereof I have hereunto subscribed my name.

JOHN V. HAWKEY.

Witnesses:
CALEB A. STEEK,
DAVID M. SARVEE.